United States Patent [19]

Matsumoto

[11] Patent Number: 5,746,119
[45] Date of Patent: May 5, 1998

[54] METHOD AND UTENSIL FOR COOKING FOOD WITH HEAT

[75] Inventor: Kesafumi Matsumoto, Atsugi, Japan

[73] Assignee: Kouken Company, Limited, Kanagawa-ken, Japan

[21] Appl. No.: 926,674

[22] Filed: Sep. 9, 1997

Related U.S. Application Data

[60] Continuation of Ser. No. 580,699, Dec. 29, 1995, abandoned, which is a division of Ser. No. 498,962, Jul. 6, 1995, Pat. No. 5,580,594.

[30] Foreign Application Priority Data

Oct. 25, 1994 [JP] Japan ................................. 6-260046

[51] Int. Cl.$^6$ .................................................. H05B 6/12
[52] U.S. Cl. .............. 99/451; 99/DIG. 14; 99/DIG. 13; 99/422; 219/621
[58] Field of Search ................. 99/451, DIG. 14, 99/DIG. 13, 422; 219/620, 621, 624, 625, 634

[56] References Cited

U.S. PATENT DOCUMENTS

| 932,242 | 8/1909 | Berry | 219/620 |
|---|---|---|---|
| 1,023,791 | 4/1912 | Anderson | 219/620 |
| 3,710,062 | 1/1973 | Peters, Jr. | |
| 3,777,094 | 12/1973 | Peters, Jr. | 219/621 |
| 3,979,572 | 9/1976 | Ito et al. | 219/621 |
| 4,354,082 | 10/1982 | Tellert et al. | 219/621 |
| 5,201,797 | 4/1993 | Weng | 99/359 |
| 5,512,733 | 4/1996 | Takikawa et al. | 219/620 |

FOREIGN PATENT DOCUMENTS

| 6-36868 | 2/1994 | Japan | 219/620 |
|---|---|---|---|

*Primary Examiner*—Reginald L. Alexander
*Attorney, Agent, or Firm*—Jordan and Hamburg

[57] ABSTRACT

A utensil body (1) and a lid (2) are made of a metallic magnetic material which generates heat when eddy currents are induced therein in order to cook food with heat which is applicable to any of boiling, steaming, sauteing, frying, casseroling, and baking or roasting, which utilizes the utensil body (1) applicable to both gas combustion heating and eddy-current heating, and which allows cooking to be performed using water, oil or air as a cooking medium.

5 Claims, 1 Drawing Sheet

METHOD AND UTENSIL FOR COOKING FOOD WITH HEAT

This application is a continuation of application Ser. No. 08/580,699 filed Dec. 29, 1995 now abandoned which is a division of application Ser. No. 08/498,962 filed Jul. 6, 1995 now U.S. Pat. No. 5,580,594.

BACKGROUND OF THE INVENTION

The present invention relates to a method of applying heat to food for preparing food without using fire at indoors, particularly at resorts and the like, and a utensil directly used for carrying out the method.

Cooking methods are roughly classified as boiling, steaming, sauteing, frying, casseroling, and baking or roasting.

Heating methods are divided into a traditional heating method using combustion gas and a modern fireless heating method by high-frequency heating or eddy-current heating.

Water, oil and air are used as a thermal medium in a heating utensil.

Cooking utensils of glass or earthenware for boiling, steaming, sauteing, frying, casseroling, baking or roasting can be heated by burning gas, but cannot be heated by eddy-currents. These materials also have the drawback that they break easily when exposed to excessive heat or when subject to a physical external force, such as dropping or shock.

Metallic materials available are aluminum, copper, stainless steel, and iron. The first three materials have the drawback that they cannot be applied to utensils for cooking by eddy-current heating. Enameling has the drawback of the surface material separating when heated without water.

Heating by gas has the advantage of quick heating and low cost, but has disadvantages, such as scorching caused by failure to turn off fire and danger of gas poisoning or explosion caused by extinction during cooking with a slow fire or by gas which leaks from the equipment in use.

Eddy-current heating has the following disadvantages: slow heating, high cost of an eddy-current generating unit, and high cost of energy due to the use of electricity. This heating method, however, has the following advantages: ability to heat with weak electric power, heating at a fixed temperature, and no danger of gas poisoning or explosion as a result of fire not being used.

SUMMARY OF THE INVENTION

Major objects of the present invention will now be described below.

An object of the present invention is to provide a method and utensil for cooking food with heat which can be applicable to any of boiling, steaming, sauteing, frying, casseroling, and baking or roasting.

Another object of the present invention is to provide a utensil for cooking food with heat applicable to heating both by burning gas and by eddy currents. Thus as shown in the drawing, the utensil body and the lid are devoid of any outer layer of insulating material.

A further object of the present invention is to provide a method and utensil for cooking food with heat in which the food can be cooked using water, oil, or air as a cooking medium.

Still another object of the present invention is to provide a utensil for cooking food with heat having a hard-to-break property.

Other objects of the present invention will become apparent from the specification and a drawing, and particularly from the scope of the appended claims.

The above-mentioned problems are solved by employing new techniques and means of construction provided by the present invention. They are described below item by item.

A first feature of a method for cooking food with heat according to the present invention is as follows. Eddy currents induced by eddy-current generating means in a main magnetic path in the bottom of a utensil body, in which food to be cooked is placed, flow through a continuous magnetic path formed endlessly over a side magnetic path in a sidewall and a top magnetic path in a lid at a rate inversely proportional to respective reluctances. Heat generating energy produced by eddy currents induced in the main magnetic path in the bottom of the utensil body is radiated to the inside of the utensil body as far-infrared radiation. Outward diffusion of the far-infrared radiation is suppressed by far-infrared radiation which is derived from heat generating energy of the side and top magnetic paths and which is directed toward the inside of the utensil body, thereby preventing a loss of cooking energy caused by the far-infrared radiation from the main magnetic path diffusing toward the outside of the sidewall and the lid in order to improve a heat insulation effect.

A first feature of a utensil for cooking food with heat according to the present invention resides in the combination of a utensil body and a lid both of which are made of a material which generates heat when eddy currents flow therethrough.

A second feature of the utensil according to the present invention is that the bottom of the utensil in the first feature has a wide flat surface which will be contacted with an eddy-current generator of an eddy-current generating unit.

A third feature of the utensil according to the present invention is that the material in the first or second feature is a metallic magnetic material allowing a magnetic path to be freely formed therein.

A fourth feature of the utensil according to the present invention is that the lid in the first, second or third feature is made of a material that does not get hot even when eddy currents flow therethrough.

The present invention employs the above-described new method and structural means. The utensil according to the present invention comprises a combination of a pan type utensil body having an opening facing up and a lid for covering the opening. Both the utensil body and the lid are made of a material which generates heat by eddy currents. The bottom of the utensil body is finished flat for easy contact with the surface of an eddy-current generating unit. The lid of a material similar to that of the utensil body is put on the utensil body to improve heating and heat insulating effects.

Metallic magnetic materials exhibit heat generating characteristics when eddy currents are induced therein, and do not break as glass and earthenware do. Preferably, the lid should be of a material that does not get hot even when eddy currents are induced.

DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE EXEMPLARY EMBODIMENT

Figure 1:
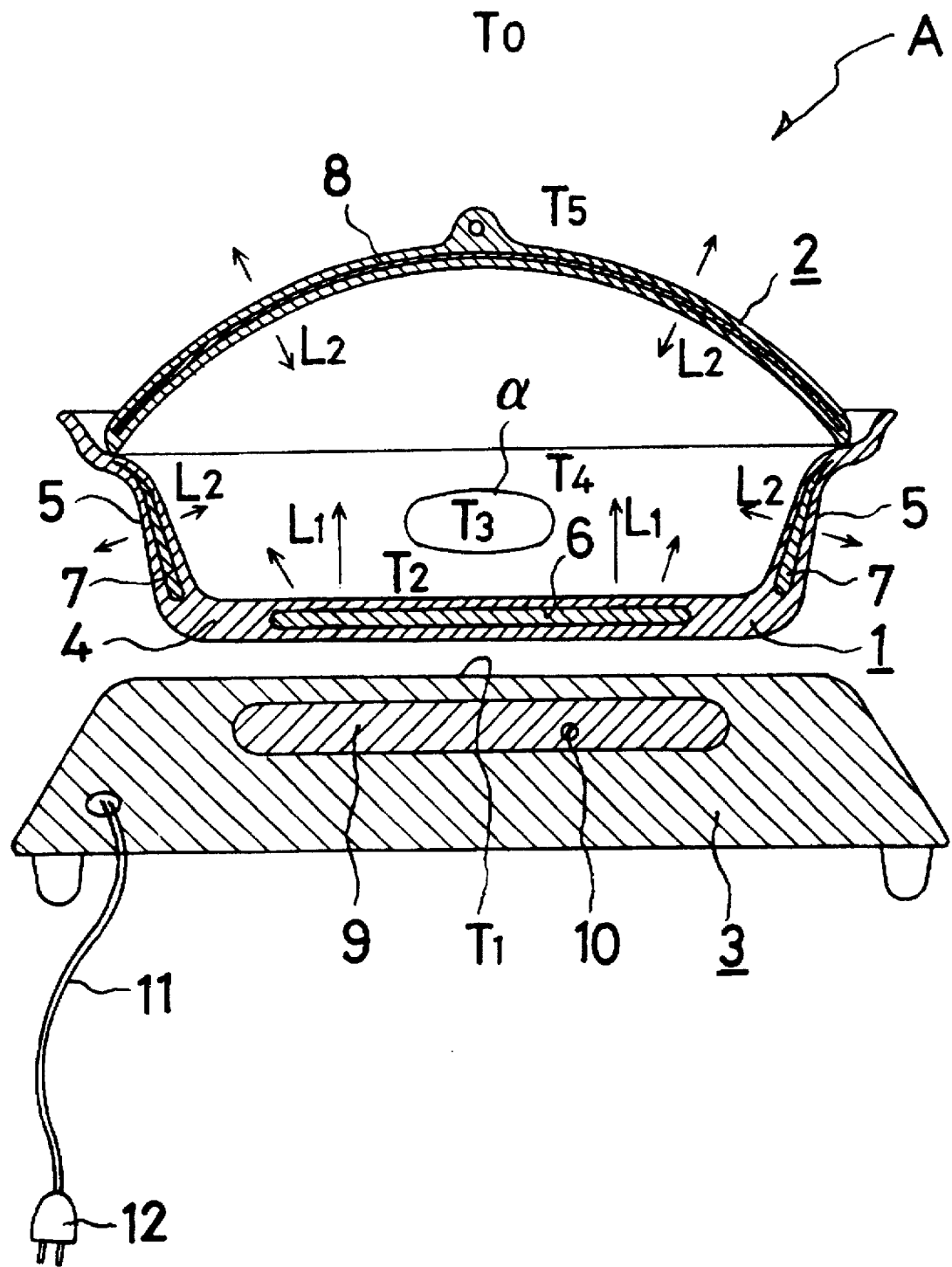
FIG. 1 is a central vertical section of the apparatus according to the embodiment of the present invention.

An apparatus according to an embodiment of the present invention will now be described, by way of example, with reference to a drawing.

FIG. 1 is a central vertical section of the apparatus according to the embodiment of the present invention.

In the figure, symbol A denotes a utensil for cooking food with heat according to the embodiment. 1 denotes a utensil body, 2 denotes a lid, 3 denotes an eddy-current generating unit, 4 denotes a bottom, 5 denotes a circumferential sidewall, 6 denotes a main magnetic path, 7 denotes a side magnetic path, 8 denotes a top magnetic path, 9 denotes an eddy-current generator, 10 denotes a temperature detector, 11 denotes a power cord, 12 denotes a plug, and $\alpha$ denotes an object to be heated.

The utensil body 1 and the lid 2 are of a metallic magnetic material which generates heat when eddy currents are induced therein and which allows magnetic paths 6, 7, 8 to be formed therein. Preferably, the lid 2 is of such a material that does not get hot even when eddy currents are induced therein. As shown in the drawing, the lid 2 is devoid of any hollow space therein.

The bottom 4 of the utensil body 1 is formed into a flat surface with a wide contact area which will be contacted with the surface of the eddy-current generator 9 of the eddy-current generating unit 3. The bottom 4 is magnetized to form the main magnetic path 6 therein.

The present embodiment assumes the above specific mode for carrying out the present invention. Next, how the present embodiment works will be described.

Of cooking methods of boiling, steaming, sauteing, frying, casseroling, and baking or roasting, boiling, steaming, sauteing, and frying use water or oil as a thermal medium, and hence their heat transfer is mainly carried out by contact therebetween.

Casseroling involves heat transfer both through far infrared radiation and through air. Hence, the description of the present embodiment below will take up this cooking method.

Sweet potato was selected as the object $\alpha$ to be heated. This is because sweet potato has various advantages including the following: its internal temperature can be indirectly measured with a needle-like sensor used as the temperature detector 10; its shape remains intact at room temperature and atmospheric pressure; and it allows the cooking temperature to be raised to 100°C. or higher.

As shown in FIG. 1, the plug 12 is inserted into an outlet, and the apparatus according to the present embodiment is placed on the eddy-current generating unit 3. Eddy currents are generated by the eddy-current generator 9. The bottom 4 of the utensil body 1 is heated by inducing eddy currents in the main magnetic path 6.

Heat thus generated heats the inside of the utensil body 1 and also heats the object $\alpha$ to be heated as time passes. A casserole of sweet potato will be prepared after maintaining an inner temperature $T_3$ of the sweet potato at 100° to 105° C.

Heat balance among relevant portions is as follows:

$T_0$=20° C.
$T_1$=260° C.
$T_2$=200° C.
$T_3$=100 to 105° C.
$T_4$=180° C.
$T_5$=75° C.

where $T_0$: ambient temperature, $T_1$: surface temperature of eddy-current generating unit 3, $T_2$: surface temperature of bottom 4 of utensil body 1, $T_3$: inner temperature of object $\alpha$ to be heated, $T_4$: inner temperature of utensil body 1, and $T_5$: surface temperature of lid 2.

A cooking method to be applied to the apparatus according to the present embodiment will now be described, by way of example, with reference to FIG. 1.

According to the principle of the cooking method, the eddy-current generator 9 of the eddy-current generating unit 3 induces eddy currents in the bottom 4 of the utensil body 1, and the inside of the bottom 4 of the utensil body 1 serves as the main magnetic path 6 to convert energy of thus induced eddy currents to heat.

Eddy currents induced in the bottom 4 of the utensil body 1 flow through the side magnetic path 7 and the top magnetic path 8, which are continuously formed in the circumferential sidewall 5 and the lid 2, at a rate inversely proportional to respective reluctances. Accordingly, the circumferential sidewall 5 and the lid 2 are also heated.

Heat generating energy produced by eddy currents induced in the main magnetic path 6 in the bottom 4 of the utensil body is radiated as far-infrared radiation $L_1$.

The use of a metallic magnetic material for the circumferential sidewall 5 of the utensil body 1 and the lid 2 seems to cause a large loss due to high thermal conductivity. However, far-infrared radiation $L_2$ from the magnetic paths 7, 8 in the circumferential sidewall 5 of the utensil body 1 and the lid 2 suppresses outward diffusion of the cooking far-infrared radiation $L_1$.

Thus, a loss of energy diffusing outward from the 7 circumferential sidewall 5 and the lid 2 is prevented, thereby improving the heat insulation effect. Accordingly, a cost raising factor stemming from the use of electricity can be reduced to some extent. As shown in the drawing, the utensil body 1 and the lid 2 are devoid of any outer layer of insulating material.

In the above description, heat generation, a major heat transfer path, and a thermally insulated method in waterless cooking are shown. When water or oil is used for cooking, heat transfers from the bottom 4 of the utensil body 1 by contact therewith. The present embodiment employs a metallic magnetic material for the lid 2. However, the lid 2 may be of a material that does not get hot even when eddy currents are induced therein. Such material allows a user to directly hold the lid 2 with a hand.

As has been described above, according to the present invention, no fire is used, and the temperature of the contact surface between a heating unit and a utensil is as low as $T_1$=260° C. Accordingly, the present invention is free from risks of gas explosion and fire, which could be caused by extinction during cooking with a slow fire or gas which leaks from equipment in use, which are peculiar to combustion gas. Of course, the present invention is free from any danger of a gas explosion.

In contrast with a conventional electric heater in which the temperature of a heat generating portion such as a Nichrome wire-rises to 600°–888° C., there is no danger of a fire or burning even when a user touches an apparatus of the present invention.

Furthermore, the present, invention can provide a safe cooking utensil which does not break when exposed to excessive heating or an external impulse force, or when being dropped, thus exhibiting excellent practicability and usefulness.

What is claimed is:

1. A cooking utensil for cooking food using eddy current generated heat in conjunction with an eddy current induction unit, comprising:

a lid formed of a metallic magnetic material capable of carrying a magnetic field and eddy currents;

a body having a bottom and sidewalls defining a cavity for accepting said food;

said body being formed of a metallic magnetic material capable of carrying a magnetic field and eddy currents;

said bottom forming a first magnetic path having a first reluctance for generating eddy currents to heat said bottom to a first temperature for cooking said food;

said sidewalls forming a second magnetic path having a second reluctance for generating eddy currents to heat said side walls to a second temperature, less than said first temperature, for limiting heat transfer from said food; and said lid forming a third magnetic path having a third reluctance for generating eddy currents to heat said lid to a third temperature, less than said second temperature and greater than an ambient temperature, for limiting heat transfer from said food.

2. The cooking utensil of claim 1 wherein said sidewalls have a tapering thickness and thus a tapering magnetic path thereby increasing said second reluctance of said sidewalls with respect to said first reluctance of said bottom to permit said sidewalls to be heated to said second temperature which is less than said first temperature.

3. The cooking utensil of claim 1 wherein said metallic magnetic material of said lid is different from said metallic magnetic material of said body such that said third temperature is sufficiently low to permit a user to remove said lid by hand.

4. A cooking utensil for cooking food using eddy current generated heat in conjunction with an eddy current induction unit, comprising:

a lid formed of a metallic magnetic material capable of carrying a magnetic field and eddy currents;

a body having a bottom and sidewalls defining a cavity for accepting said food;

said body being formed of a metallic magnetic material capable of carrying a magnetic field and eddy currents;

said bottom forming a first magnetic path having a first reluctance for generating eddy currents to heat said bottom to a first temperature for cooking said food;

said sidewalls forming a second magnetic path having a second reluctance for generating eddy currents to heat said side walls to a second temperature, less than said first temperature, for limiting heat transfer from said food; and said lid forming a third magnetic path having a third reluctance for generating eddy currents to heat said lid to a third temperature, less than said second temperature and greater than an ambient temperature, for limiting heat transfer from said food, and said third temperature being sufficiently low to permit a user to remove said lid by hand.

5. A cooking utensil for cooking food using eddy current generated heat in conjunction with an eddy current induction unit, comprising:

a lid formed of a metallic magnetic material capable of carrying a magnetic field and eddy currents;

a body having a bottom and sidewalls defining a cavity for accepting said food;

said body being formed of a metallic magnetic material capable of carrying a magnetic field and eddy currents;

said bottom forming a first magnetic path having a first reluctance for generating eddy currents to heat said bottom to a first temperature for cooking said food;

said sidewalls forming a second magnetic path having a second reluctance for generating eddy currents to heat said side walls to a second temperature, less than said first temperature, for limiting heat transfer from said food;

said sidewalls having a tapering thickness and thus a tapering magnetic path thereby increasing said second reluctance of said sidewalls with respect to said first reluctance of said bottom to permit said sidewalls to be heated to said second temperature which is less than said first temperature; and said lid forming a third magnetic path having a third reluctance for generating eddy currents to heat said lid to a third temperature, less than said second temperature and greater than an ambient temperature, for limiting heat transfer from said food, said metallic magnetic material of said lid being different from said metallic magnetic material of said body such that said third temperature is sufficiently low to permit a user to remove said lid by hand.

* * * * *